T. OLIVER, DEC'D.
O. O. OLIVER, EXECUTRIX.
TROLLEY POLE FOR ELECTRIC RAILWAY CARS.
APPLICATION FILED JUNE 30, 1908.
928,879.
Patented July 20, 1909.
3 SHEETS—SHEET 3.
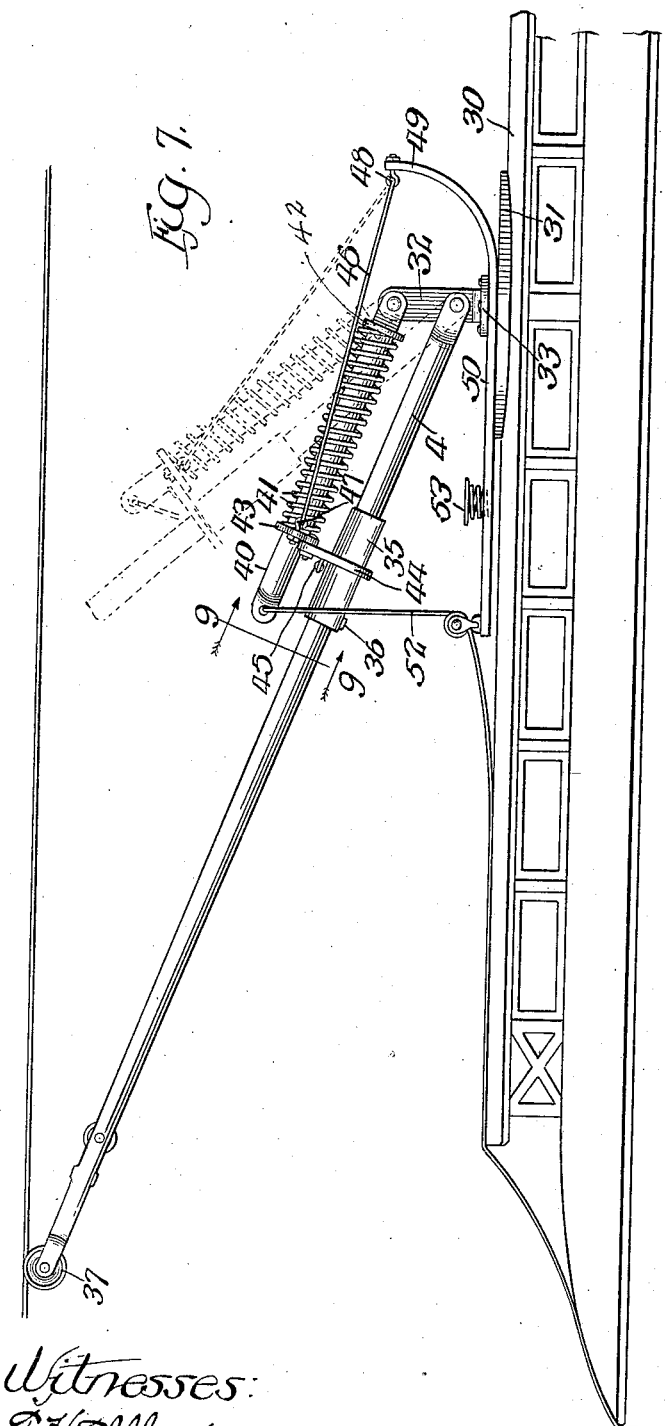

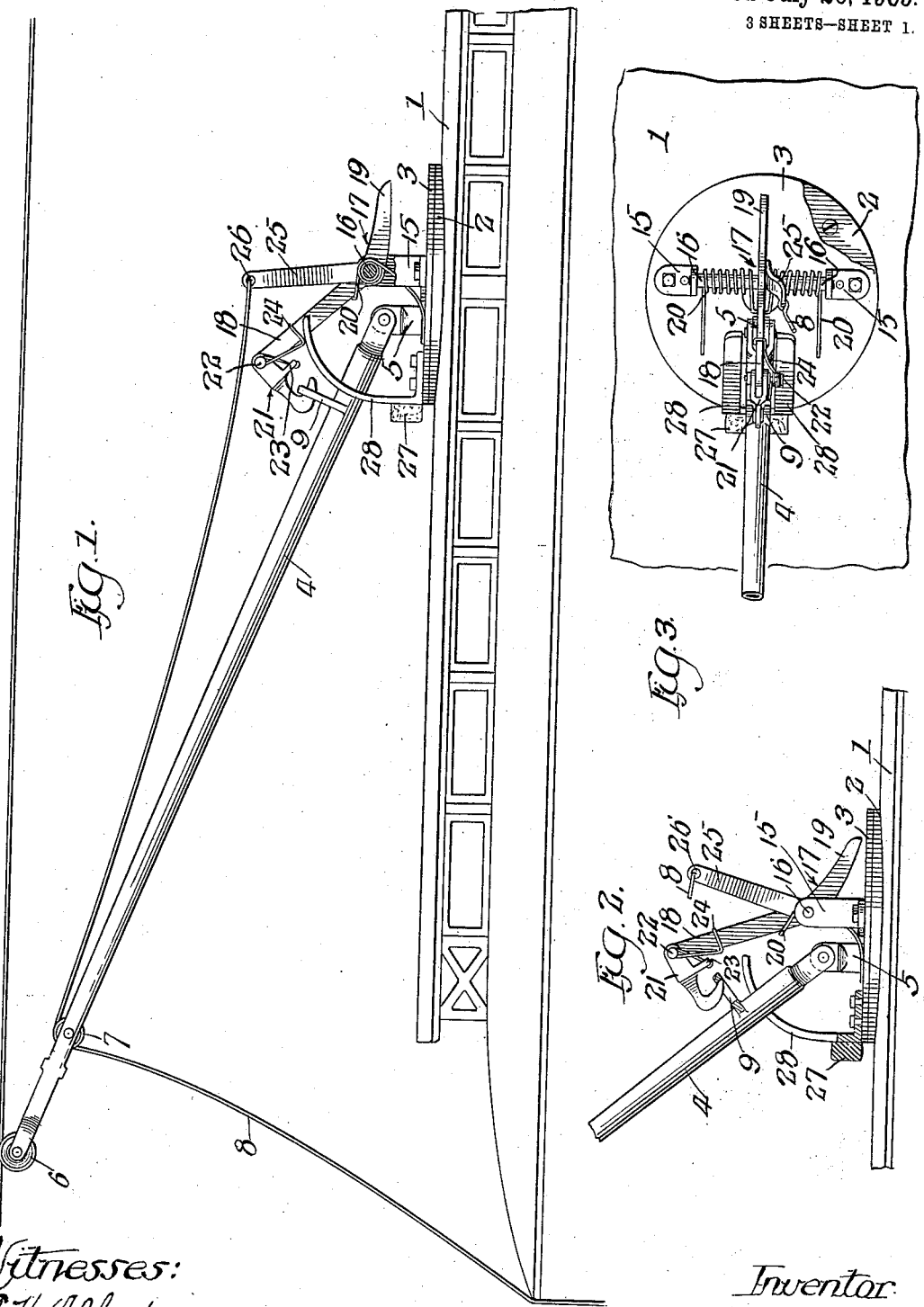

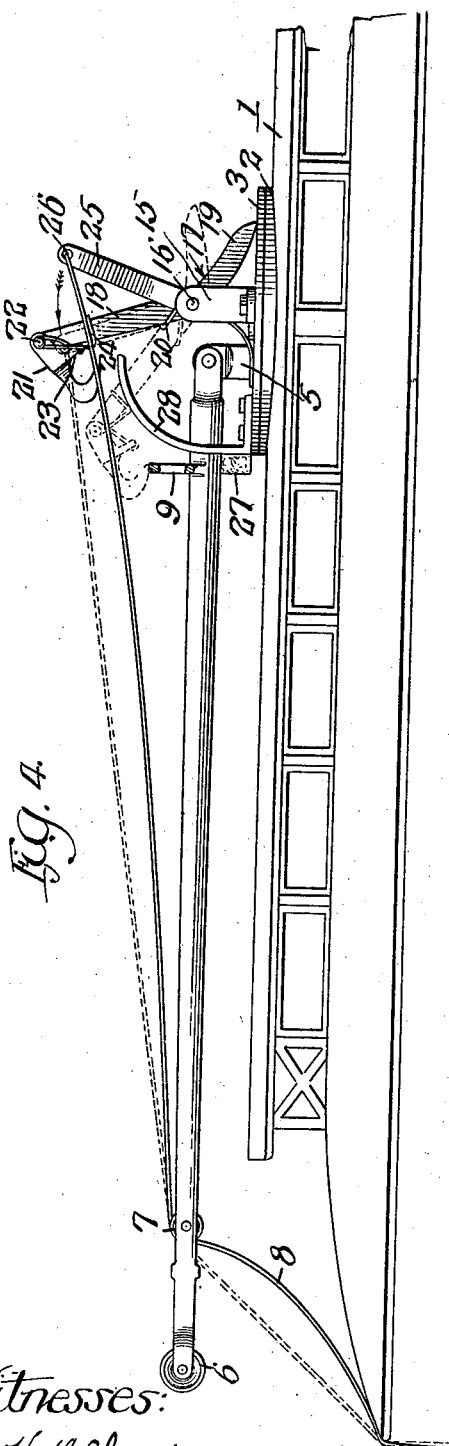

UNITED STATES PATENT OFFICE.

THOMAS OLIVER, OF CHICAGO, ILLINOIS, ASSIGNOR OF ONE-FOURTH TO J. W. CROUCH, OF CHICAGO, ILLINOIS; OLGA OTTONIA OLIVER EXECUTRIX OF SAID THOMAS OLIVER, DECEASED.

TROLLEY-POLE FOR ELECTRIC-RAILWAY CARS.

No. 928,879.     Specification of Letters Patent.     Patented July 20, 1909.

Application filed June 30, 1908. Serial No. 441,119.

*To all whom it may concern:*

Be it known that I, THOMAS OLIVER, a citizen of the United States, and a resident of Chicago, in the county of Cook and State of Illinois, have invented certain new and useful Improvements in Trolley-Poles for Electric-Railway Cars; and I do hereby declare that the following is a full, clear, and exact description thereof, reference being had to the accompanying drawings, and to the figures of reference marked thereon, which form a part of this specification.

This invention relates to means whereby a trolley pole, such as is used for delivering current from an overhead conductor to the motor of an electrically driven car, will be automatically released and caused to drop below the level of the overhead conductor and its associated suspension wires or brackets, when the grooved or trolley wheel, which is carried by the said trolley pole in contact with the said overhead conductor, becomes disengaged therefrom.

The invention relates more particularly to a device of the character stated, in which the trolley pole, which is pivotally supported at its base, is maintained by a spring actuating lifting device with the trolley wheel in contact with the trolley wire, and means are provided acting to automatically release the said trolley pole from the lifting device and cause it to swing downward below the trolley wire when the said trolley wheel becomes disengaged therefrom.

The invention consists in the matters hereinafter set forth and more particularly pointed out in the appended claims.

In the drawings:—Figure 1 illustrates a fragmentary side elevation of the top of a trolley car and a device embodying my invention applied thereto. Fig. 2 is a side elevation of the device with parts in section. Fig. 3 is a top plan view of the device with parts broken away. Fig. 4 is a fragmentary side elevation of a street car illustrating the device in two extreme positions. Fig. 5 is an end elevation of the device looking at it from the rear end of the car. Fig. 6 is an end elevation of the device taken from the front end of the car. Fig. 7 is a fragmentary side elevation of a trolley car illustrating a modified form of my invention. Fig. 8 is a top plan view of the device illustrated in Fig. 7. Fig. 9 is a detail sectional view of parts shown in Figs. 7 and 8.

Referring to the said drawings, 1 designates the top or roof portion of a trolley car. Secured to the top of the said roof is a base plate 2 which is circular in shape. Rotatively mounted upon the plate 2 is a base plate 3 similar in shape to the plate 2 and upon which are mounted the parts relating to this invention.

A trolley pole 4, similar in construction to those ordinarily used, is pivotally supported at its inner end or base upon a bracket or support 5 which is attached to the plate 3 at or near the longitudinal center of the car roof. At its outer or free end the said trolley pole is formed in the shape of a fork, between the arms of which a trolley wheel 6, adapted to engage the overhead conductor, is rotatively supported. Near its outer end the said trolley pole is provided with a slot within which is mounted a grooved pulley 7 over which a trolley rope 8 is trained. Near its lower end or base the said trolley pole is provided with a lug 9 which is rigidly secured to the said pole and which extends upwardly therefrom at right angles thereto; said lug being provided with an aperture for engagement with a supporting device.

A supporting device which is adapted to engage the trolley pole to maintain it in position with the trolley wheel in contact with the wire and to automatically release the said pole and permit it to drop below the level of the wire when the said wheel becomes disengaged therefrom, is constructed as follows:

Rigidly supported upon the plate 3 and extending upwardly therefrom are two angular brackets 15, 15. Supported in the upper ends of the said brackets is a transverse, horizontal shaft 16. Mounted centrally upon said shaft is a lever 17 comprising an upwardly extending lifting arm 18 and a downwardly extending stop arm 19, said stop arm 19 being adapted for contact with the base plate 3 to limit the backward movement of the lifting arm 18. A spring 20, of sufficient stiffness to maintain the trolley pole with the trolley wheel in engagement with the overhead conductor, surrounds the shaft 16 and is adapted to bear upwardly upon the underside of the arm 18 of the lever 17. At the outer end of the said lever arm 18 is located a hook-shaped detent 21 which is pivotally supported thereon by means of a pin 22. The hooked end of said detent extends downwardly and is adapted to engage in the aperture of the lug 9 on the trolley pole 4. The pivotal axis of the lever arm 18 is located at such distance horizontally from the axis on which the trolley pole swings that the detent 21 will be in position to engage the lug 9 when the pole is depressed or at any point within the extent of its normal swing or path of oscillation, but will be above and disengaged from said lug when the trolley pole is swung upwardly above its operative position and the arm 18 is correspondingly elevated. In other words, by the eccentric mounting of the trolley pole and the detent carrying arm 18, the detent will be in position to be engaged with, and to remain in engagement with, the trolley pole in the normal swing of the latter, but when said trolley pole is swung upwardly far enough to bring its outer end above the conductor, the corresponding movement of the arm 18 will carry the detent outwardly or upwardly, and away from and out of engagement with the lug 9 on the trolley pole. It follows that, if the trolley pole which is lifted by the action of the spring operated arm 18, be allowed to rise above its usual position, as when the trolley wheel escapes from the conductor, the detent will become automatically disengaged from the trolley pole and the latter will drop to its lowermost position.

Upon the under side of the detent 21 is formed a stop arm 23 which is adapted for contact with the lever arm 18 and limits the downward swinging movement of the said detent around its supporting pin 22. A spring 24, which is attached at one end to the shoulder 23, is coiled around the pivot pin 22 and supported at its other end on the lever arm 18, tends to draw the detent 21 inward with the shoulder 23 against the said lever arm 18 and thereby holds said detent normally in position for engagement with the lug on the trolley pole.

For bringing the detent 21 into engagement with the trolley pole, after it has become disengaged therefrom by reason of the trolley escaping from the wire, there is provided an upwardly extending operating arm 25 which is rigidly attached to the lifting arm 18 at its point of support upon the shaft 16. At its outer end the said arm is provided with an eye 26 for the attachment of the trolley rope 8, which is trained over the pulley 7 near the outer end of the trolley pole 4, and extends downwardly therefrom to the rear of the car where it is within the control of the conductor.

For absorbing the shock imparted by the weight of the trolley pole when it is released from the supporting device and drops toward the roof of the car there is provided a bumper 27, of a suitable resilient construction, which is attached to the plate.

The trolley pole is prevented from lateral deflection out of the vertical plane of the bumper 27, by means of two curved guide arms 28, 28 which are rigidly attached to the plate 3 and curve upwardly therefrom toward the forward end of the car, said guide arms being arranged one on either side of the said trolley pole and at such a distance apart that the said trolley pole can move freely between them in a vertical plane only.

The operation of the device made as hereinbefore described is as follows: Assuming that the trolley pole 4 is resting in its inoperative position upon the bumper 27 and it is desired to lift it to position with the trolley wheel in engagement with the trolley wire, this will be accomplished by the conductor grasping the rope 8 and pulling the lever 25 downward until the detent 21 in the outer end of the lever arm 18 becomes engaged with the lug 9 on the said trolley pole. The pivots of the trolley pole and the arm 18 are at such distance apart horizontally that the spring actuated detent will at this time be in position to engage the lug 9, which latter throws the hooked end of the detent backward where the latter is brought into contact with the lug 9, permitting the lug to pass the hooked end of the detent, which will be thrown inwardly into engagement with the aperture of the lug by the action of the detent-actuating spring. The upward pressure exerted by the spring 20 upon the lever arm 18 operates to lift the trolley upward to and press it against the wire. The trolley is guided into engagement therewith by means of the rope 8 in the usual manner. If, however, the trolley wheel 6 becomes disengaged from the wire, the pressure of the spring 20 upon the lever arm 18 will carry the trolley pole upward until the said trolley pole and lever arm have reached such a position with respect to each other that the detent 21, the stop arm of which is at this time in contact with the arm 18, will be drawn out of its engagement with the lug 9 on the trolley pole and the weight of the said pole will cause it to drop downward between the guide arms 28, 28 until it rests upon the bumper 27. The operation of replacing the trolley with the wheel in contact with the trolley wire will be as previously described.

As one modification of a device made in accordance with this invention there is illustrated in Figs. 7, 8, and 9 of the drawings a construction embodying the same general idea. As shown in the said drawings, 30 designates the top or roof of the trolley car, having a circular plate 31 secured thereto. Centrally mounted upon the said plate 31 and having rotation therewith is an upwardly extending bracket arm 32 which is formed with an enlarged circular portion 33 at its base. In this modified form of construction, the trolley pole 4 used may be the same as that used in the construction hereinbefore described with the exception that the lug 9 near the lower end of the former pole is replaced by a triangular block or collar 35, which surrounds the said trolley pole and is secured thereto by means of a set screw 36. At its lower end or base said trolley is pivotally supported upon the bracket arm 32 near the lower end thereof and is provided at its outer end with a trolley wheel 37. For supporting the trolley pole in position with the trolley wheel in contact with the wire there is provided a lifting arm 40 which is pivotally supported at one of its ends upon the upper end of the bracket arm 32 its pivot being at a distance vertically from that of the trolley pole. Surrounding the said arm is a coiled spring 41, which is in contact at its lower end with a collar 42 which is secured rigidly to the said arm 40. At its outer end the said spring 41 bears outwardly against a collar 43 which is adapted to slide backward and forward upon the said arm. Pivotally supported upon the said collar 43 are two laterally swinging detents 44, 44 which extend downwardly therefrom and are provided at their lower ends with inwardly extending hooked ends which are adapted to engage with the lower side of the triangular block 35 on the trolley pole. A coiled spring 45, connected with the detents 44, 44 at a point slightly below the pivotal points thereof, tends to draw their lower or free ends toward each other. For maintaining the coiled spring 41 in compression so that it will have a tendency to swing the arm 40 upward around its pivotal support there are provided two rods 46, 46 which are secured to the movable collar 43 by means of links 47, 47 attached thereto. The said rods are attached at their other ends to two links 48, 48 carried in the outer ends of two upwardly curved arms 49, 49 on a supporting plate 50, the said plate 50 being secured to the enlarged circular portion 33 of the bracket arm 32 and extend backward therefrom in a longitudinal direction or parallel with the top of the car, with a portion thereof resting in contact with the circular plate 31. Secured to the backwardly extending end of the supporting plate 50 is a pulley under which is trained a trolley rope 52, which is attached to the free end of the supporting arm 40; said trolley rope being adapted for controlling the trolley pole from the rear end of the car, in the usual manner. At an intermediate point between the upwardly extending bracket arm 32 and the backwardly extending end of the supporting plate 50 is located a spring bumper 53 which is mounted upon the said supporting plate 50 and is adapted to absorb the shock from the weight of the trolley pole when it drops to its inoperative position.

As will be seen from the construction described, the trolley pole 34 will be held in position with the trolley wheel thereon in contact with the trolley wire by means of the spring actuated lifting arm 40, which is attached to the said pole through the medium of the hooked detents 44, 44 carried at the outer end of the said lifting arm. In case the trolley flies from the wire the action of the spring 41 will swing the lifting arm and trolley pole upward around their pivotal supports and, since the rods 46, 46 swing around a center eccentric with respect to the pivotal support of the lifting arm 40, the sliding collar 43 will be moved outwardly on the said arm until the hooked detents 46, 46 become disengaged from the collar and, the space between the hooked portion of the said arms being sufficient to permit the trolley pole to pass therebetween, the said trolley pole will drop down upon the bumper 53. In order to return the trolley pole to its operative position the supporting arm 40 is swung downwardly by means of the rope 52 until the hooked detents become engaged with the triangular block or collar 53 and the pole will be lifted to position for the trolley wheel to engage the wire by the action of the spring 41 on the supporting arm 40.

I claim as my invention:—

1. The combination with a pivoted trolley pole, of a spring actuated lifting arm pivoted eccentrically with respect to the trolley pole, and a detent carried by the lifting arm, adapted to connect the said lifting arm with the trolley pole, for lifting the latter into operative position; said detent being shifted to automatically release the lifting arm from the trolley pole and permit the latter to drop, when the pole rises above its normal range of movement.

2. The combination with a trolley pole, of a rotative base plate upon which the said trolley pole is pivotally supported, brackets carried by the said rotative plate, a shaft mounted in said brackets at a distance horizontally from the pivotal support of the trolley pole, a spring actuated lifting arm supported upon the said shaft, and a detent carried by said arm which is adapted to engage with the trolley pole to lift the latter into operative position and which is automatically actuated to release the said trolley pole and permit the same to drop when the pole rises above its normal range of movement.

3. The combination with a pivotal trolley pole, an apertured lug carried by the said trolley pole, a spring actuated lifting arm pivoted eccentrically with respect to the said trolley pole, and a hooked detent carried at the outer end of the said lifting arm, said detent being adapted to engage the apertured lug on the trolley pole to raise the latter into operative position and which is automatically actuated to become disengaged therefrom when the pole rises above its normal range of movement.

4. The combination with a pivoted trolley pole, of a vertically swinging lifting arm pivoted eccentrically with respect to the said trolley pole, an apertured lug carried by the said trolley pole, a hooked detent pivotally supported on the said lifting arm with its hooked end directed downwardly to engage with the apertured lug on the trolley pole, and a spring acting on the said detent to hold the same in position for engagement with said lug on the pole.

5. The combination with a pivoted trolley pole, of an apertured lug carried by the said trolley pole, a spring actuated lifting arm pivoted eccentrically with respect to the said trolley pole, a hooked detent pivotally supported on the said lifting arm with its hooked end directed downwardly to engage with the lug on the trolley pole, and a spring acting on the detent to hold the same in position for engagement with the lug on the lifting arm, said detent being provided with a stop-arm adapted to bear against the lifting arm to limit the downward movement of the said detent.

6. The combination with a trolley pole, of a rotative base plate upon which the said trolley pole is pivotally supported, brackets carried by said base plate, a shaft mounted in the said brackets at a distance horizontally from the pivotal support of the trolley pole, a spring actuated lifting arm mounted upon the said shaft, a detent carried by said arm which is adapted to engage with the trolley pole to lift the latter into operative position and which is automatically actuated to release the trolley pole when the latter rises above its normal range of movement, and guide arms carried by the said plate adapted to prevent the lateral deflection of the trolley pole out of a vertical plane.

7. The combination with a pivoted trolley pole, of a spring actuated lifting arm pivoted eccentrically with respect to the trolley pole, a spring actuated detent carried by said lifting arm and adapted to connect the same with the trolley pole, and a trolley rope connected with said lifting arm and engaging the outer end of the trolley pole.

8. The combination with a pivoted trolley pole, of a spring actuated lifting arm pivoted eccentrically with respect to the trolley pole, said lifting arm being provided with an operating arm rigidly attached thereto, a spring actuated detent carried by the lifting arm and adapted to connect the same with the trolley pole, and a trolley rope attached to said operating arm and engaging the outer end of the trolley pole.

9. The combination with a pivoted trolley pole, of a spring actuated lifting arm pivoted eccentrically to the trolley pole and provided with a rigid stop arm to limit its backward swinging movement, and a spring actuated detent carried by the lifting arm and adapted to connect the same with the trolley pole.

10. The combination with a pivoted trolley pole, of a base plate upon which said pole is mounted, brackets carried by said plate, a horizontal shaft mounted in said brackets at a distance horizontally from the pivot of the trolley pole, a lifting arm pivotally supported on said shaft, said lifting arm being provided with a rigidly attached stop arm adapted for contact with the base plate to limit the backward movement of the lifting arm, and an operating arm rigidly attached to said lifting arm.

In testimony, that I claim the foregoing as my invention I affix my signature in the presence of two witnesses, this 25th day of June A. D., 1908.

THOMAS OLIVER.

Witnesses:
GEORGE R. WILKINS,
T. H. ALFREDS.